United States Patent [19]
Worth et al.

[11] Patent Number: 5,499,831
[45] Date of Patent: Mar. 19, 1996

[54] FOLDING STROLLER FOR CHILD'S CAR SEAT

[75] Inventors: Ronald K. Worth, Menlo Park; Eric G. Pfaff, Redondo Beach, both of Calif.

[73] Assignee: Worth Pfaff Innovations, Inc., Manhattan Beach, Calif.

[21] Appl. No.: 130,319

[22] Filed: Oct. 1, 1993

[51] Int. Cl.[6] .................................. B62B 7/06; B62B 7/14
[52] U.S. Cl. ........................ 280/30; 280/643; 280/649; 280/650; 280/47.41
[58] Field of Search .................... 280/643, 647, 280/648, 649, 650, 657, 658, 47.34, 47.36, 47.38, 47.39, 47.41, 30; 297/1, 3

[56] References Cited

U.S. PATENT DOCUMENTS

| | | | |
|---|---|---|---|
| 2,438,829 | 3/1948 | Skolnik | 280/643 |
| 3,083,997 | 4/1963 | Chreist, Jr. | |
| 3,829,113 | 8/1974 | Epelbaum | 280/47.25 |
| 4,435,012 | 3/1984 | Kassai | 280/643 |
| 4,537,414 | 8/1985 | Nusbaum | 280/47.41 |
| 4,570,956 | 2/1986 | Dyer | 280/30 |
| 4,606,550 | 8/1986 | Cone | 280/650 |
| 4,750,783 | 6/1988 | Irby et al. | 297/250 |
| 4,768,795 | 9/1988 | Mar | 280/30 |
| 4,770,437 | 9/1988 | Glaser | 280/650 |
| 4,822,064 | 4/1989 | Hunter | 280/30 |
| 4,834,403 | 5/1989 | Yanus | 280/30 |
| 4,852,894 | 8/1989 | Dyer | 280/30 |
| 4,872,693 | 10/1989 | Kennel | 280/30 |
| 4,874,182 | 10/1989 | Clark | 280/30 |
| 4,878,680 | 11/1989 | Molnar | 280/30 |
| 4,896,894 | 1/1990 | Singletary | 280/30 |
| 4,907,818 | 3/1990 | Chai | 280/650 |
| 4,915,401 | 4/1990 | Severson | 280/30 |
| 4,921,261 | 5/1990 | Sadler, Jr. et al. | 280/30 |
| 5,201,535 | 4/1993 | Kato | 280/30 |

*Primary Examiner*—Anne Marie Boehler
*Attorney, Agent, or Firm*—Willian Brinks Hofer Gilson & Lione

[57] ABSTRACT

A stroller that accepts and supports various child's car seats is easily collapsible by actuating the locking hinge using one hand. The collapsible stroller includes a lever whereby the child's car seat can be easily removed from the stroller by activating the lever with one hand and lifting the child's car seat with the other. The stroller is adaptable to receive a multitude of existing child's car seats.

4 Claims, 5 Drawing Sheets

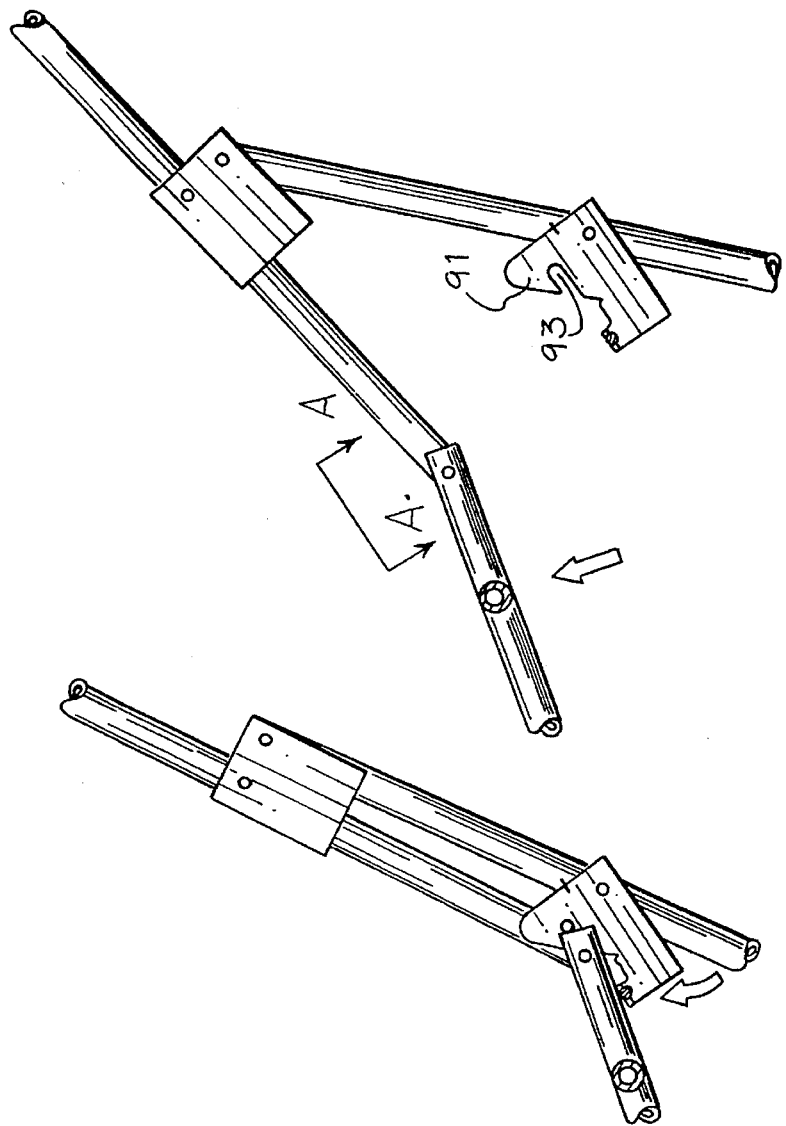
Fig. 4C
Fig. 4B
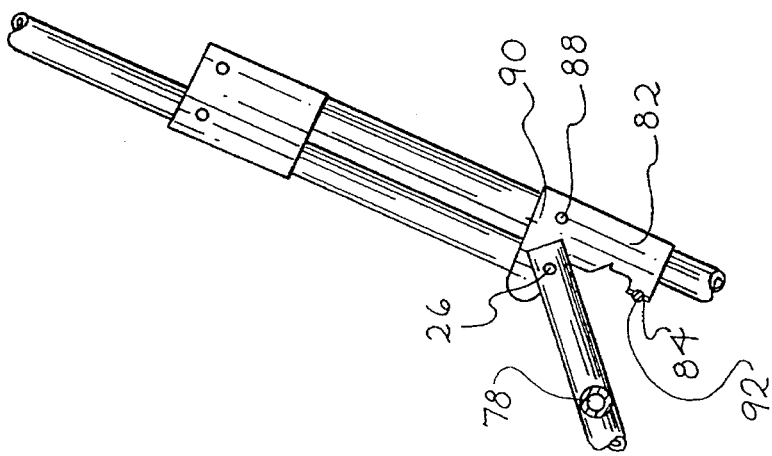
Fig. 4A

FOLDING STROLLER FOR CHILD'S CAR SEAT

BACKGROUND OF THE INVENTION

The field of invention relates generally to a baby stroller and particularly to a baby stroller with an easy folding frame that quickly receives or releases conventional child car seats.

Although baby strollers that receive or convert into child car seats are well known in the prior art there are still many problems inherent with the existing designs. Some inventions, such as described in U.S. Pat. No. 4,822,064 issued to Hunter, describe a child's car seat that converts from a car seat into a stroller. The frame assembly and the wheel assembly in this type of design are attached to the car seat which acts to increase the total weight of the apparatus even when the wheel assembly is not in use. A further disadvantage inherent in this type of design is that any dirt or mud acquired while using the device as a stroller is subsequently deposited in the car when the device is converted and used as a child's car seat.

The prior art also includes baby strollers in which the seat may be removed and used as a child's car seat. However, these inventions, such as described in U.S. Pat. No. 4,768,795 issued to Mar, utilize car seats that must have specialized designs to enable their use on both a stroller and in an automobile. Also, inventions utilizing this type of technology, such as described in U.S. Pat. No. 4,921,261 issued to Sadler, Jr., are difficult to convert from baby stroller to the child's car seat, making the conversion impractical in inclement weather. The present invention allows the use of existing, commercially available child car seats, thus reducing the overall cost, especially for families that have already purchased a child car seat. The present invention is also designed for quick and easy removal of the child's car seat and a simple one-hand conversion of the stroller from an operative state to a storage state.

SUMMARY OF THE INVENTION

In view of the above-mentioned disadvantages inherent in the prior art for baby strollers, the present invention provides a baby stroller that contains all of the advantages of the prior art while including none of the disadvantages.

It is a primary object of the present invention to provide a stroller which accepts and supports existing child car seats. The stroller is made up of a simple, yet sturdy frame which will have low manufacturing costs and still provide the strength necessary to support a child's car seat and a child.

It is another object of the present invention to provide a stroller that accepts several existing child car seats, reducing the cost to the consumer who may have previously purchased a child's car seat.

It is another object of the present invention to allow the transfer of a child in a child car seat from an automobile to a stroller without removing the child from the child car seat.

It is another object of the present invention to provide a stroller with a locking mechanism that can be quickly folded into its storage state in a single one-handed movement, or unfolded into its operative state again in a single movement.

It is another object of the present invention to provide a stroller that will allow the quick and easy removal of the child's car seat using one hand to release the child's car seat from the stroller and the other hand to simultaneously remove the child's car seat from the stroller.

Further objectives and advantages of this invention will become apparent on examination of the following description with reference to the accompanying drawings.

BRIEF DESCRIPTION OF THE DRAWINGS

FIG. 4 is a three-step exploded view of the locking hinge assembly as the stroller moves from its operative state towards its storage state;

DETAILED DESCRIPTION OF THE PREFERRED EMBODIMENT

Figure 1:
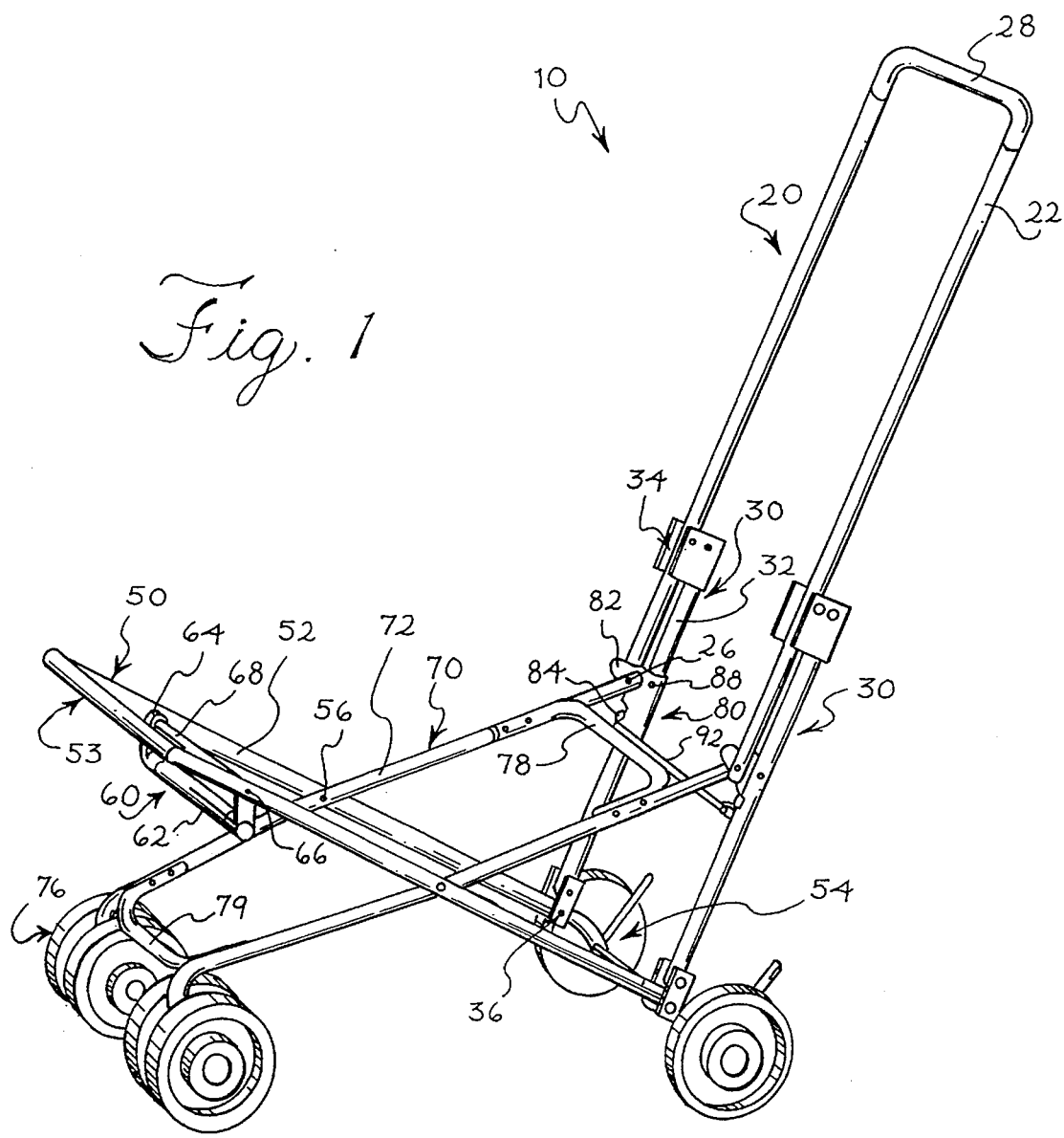
FIG. 1 is a perspective view of a preferred embodiment of a stroller according to the present invention in its operative state.
Figure 2:
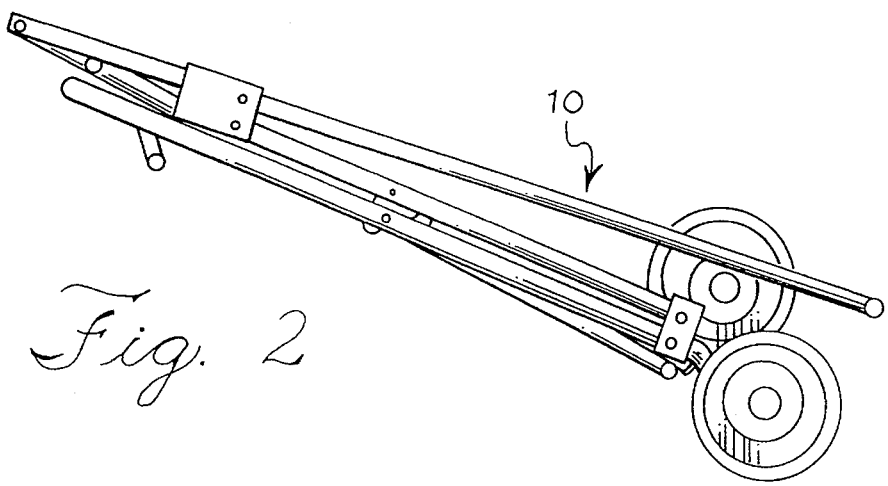
FIG. 2 is a perspective view of a preferred embodiment of a stroller according to the present invention after conversion to its storage state.

The stroller apparatus 10 shown in FIG. 1 in its operative state is made up of a handle frame section 20, two back bar sections 30, a rear wheel frame section 50, and a front wheel frame section 70. The stroller apparatus 10 is shown in FIG. 2 in its storage state. The term stroller is used to define a baby stroller or a baby carriage. The preferred embodiment of the stroller apparatus is symmetrical left to right. Unless otherwise specified, the left side of the stroller will be described. It should be appreciated that the right side of the stroller would be described in the same manner as the left side.

Figure 7:
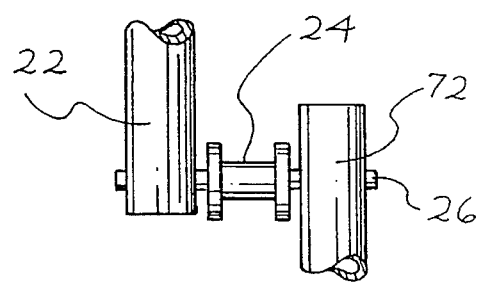
FIG. 7 is a detailed front view of the latching area.

FIG. 1 shows a handle frame section 20 which consists of a U-shaped bar 22, a handle grip 28, a latch hinge pin 26 and a latch bushing 24 (see FIG. 7). At the mid-section of the U-shaped bar 22 is the handle grip 28 which is utilized to move the stroller. Opposite the handle grip 28, at the end of the U-shaped bar 22 is the latch hinge pin 26 and the latch bushing 24. The latch hinge pin 26 fastens the front wheel frame section 70 to the handle frame section 20. The latch bushing 24 allows for a space between the front wheel frame section 70 and the handle frame section 20 for the latch hinge 82 to attach when the stroller 10 is in the operative state. Between the handle grip 28 and the latch hinge pin 26 is attached the top hinge assembly 34. The handle frame section provides support for the stroller while also providing an interface between the stroller and the user.

Also shown in FIG. 1 is the back bar section 30. The back bar section 30 includes a back bar 32 with a top hinge assembly 34 attached at the top end. At the opposite end of the back bar section 32 is attached the bottom hinge assembly 36. Between the top hinge assembly 34 and the bottom hinge assembly 36 is a pivot pin 88. The pivot pin 88 is utilized to hold the locking hinge assembly 80 while allowing the locking hinge assembly 80 the freedom to rotate about the pivot pin 88.

The locking hinge assembly 80, as shown in FIGS. 1, 4 and 7, is actuated to lock the stroller into its operative state. The locking hinge assembly 80 consists of two locking hinges 82, each having a chamfer 91, an indenture 93, and a restricting tab 84, a pivot pin 88, a spring 90 and a locking hinge bar 92, which is used to unlock the locking hinge assembly 80. The locking hinge assembly 80 is attached to the back bar 32 by the pivot pin 88. The pivot pin 88 allows the locking hinge 82 to rotate freely. The locking hinge assembly 80 locks when the indenture 93 engages the latch bushing 24 which is attached to the latch hinge pin 26. The helical spring 90 forces the locking hinge 82 around the pivot pin 88, while the restricting tab 84 limits the travel of the locking hinge 82. The restricting tab 84 positions the locking hinge 82 in such a manner that when the stroller 10 is converted from the storage state to the operational state the chamfer 91 automatically slides as a cam against the latch bushing 24 which rotates the locking hinge until the indenture 93 slides over the latch bushing 24. The indenture 93 is oriented in such a way that it locks onto the latch bushing 24, which prohibits rotation of the handle frame section 20 about the top hinge assembly 34, thereby locking the stroller in the operational position.

Returning to FIG. 1, the rear wheel frame section 50 consists of a rear wheel frame 52, rear wheel assembly 54, a scissors hinge pin 56 and a lever assembly 60. Attached near one end of the rear wheel frame 52 is the bottom hinge assembly 36 and the rear wheel assembly 54. While, near the opposite end of the rear wheel frame 52, is the lever assembly 60. The lever assembly 60 consists of two pivoting caps 64, a release lever 62, a hinge rod 66 and a hinge rod sheath 68. The hinge rod 66 is attached to the rear wheel frame 52. The release lever 62 is rotatively connected, via the pivoting caps 64 to the hinge rod 66. The hinge rod sheath 68 covers over the hinge rod 66 enlarging the overall circumference of the hinge rod 66 thereby creating a better fit between the hinge rod 66 and the child's car seat 12 when the child's car seat is placed on the stroller 10. The release lever 62, as will be seen later, is actuated to easily remove the child's car seat.

The front wheel frame section 70 consists of the front wheel frame 72, the front wheel assembly 76, the upper support bar 78 and the lower support bar 79. The front wheel assembly 76 is attached at one end of the front wheel frame 72 such that the front wheel assembly 76 will fold compactly when the stroller is converted to its storage state. The latch hinge pin 26 attaches the other end of the front wheel frame 72 to the end of the handle frame 20 opposite the handle grip 28. Near the front wheel assembly 76 is located a lower support bar 79, and near the opposite side of the front wheel frame section 70 is located an upper support bar 78. The support bars 78, 79 are used to support the stroller 10. Also, upper support bar 78 is utilized to support a child's car seat 12 when received by the stroller 10, and as a handle to assist in converting the stroller from the operational position to the storage position. The front wheel frame 72 is shaped in such a way as to inset the front wheel assembly 76 for compact folding inside the rear wheel assembly 54 in the storage state.

The handle frame section 20 is connected to the back bar section 30 via the top hinge assembly 34. Furthermore, the back bar section 30 is attached to the rear wheel frame section 50 by the bottom hinge assembly 36. Finally, the front wheel frame section 70 and the rear wheel frame section 50 are connected approximately mid-way between by the scissors hinge pin 56, allowing each section to move in a scissors-like motion with respect to the other section.

In accordance with the above-described stroller apparatus 10, the four hinges; the latch hinge pin 26, the top hinge assembly 34, the bottom hinge assembly 36 and the scissors hinge pin, along with the U-shaped bar 22, back bar 32, rear wheel frame 52 and the front wheel frame 72, comprise a four-bar linkage which allows the stroller to fold compactly, as will be described later, into its storage state.

The stroller design allows for easy conversion from its operational state to its storage state using one hand in a single motion. Refer to FIG. 2, a side view of the stroller 10 in its storage state, and FIG. 4, a sequence showing the locking hinge assembly 80 in three stages of the disengagement process.

FIGS. 4A, 4B, 4C show the conversion of the stroller from the operative state to the storage state. To begin the conversion to the storage state, the user grasps both the locking hinge bar 92 and the upper support bar 78 with one hand.

As shown in FIG. 4B, the user then moves the locking hinge bar 92 towards the upper support bar 78, thereby stretching the spring 90 and rotating the locking hinge 82 around the pivot pin 88. As the locking hinge 82 rotates, the indenture 93 in the locking hinge 82 will disengage the latch bushing 24, unlocking the locking hinge 82 and allowing the stroller 10 to begin converting to its storage state.

Next, as shown in FIG. 4C, the user, in the same motion and using the same hand, lifts upwardly on the upper support bar 78. Lifting the upper support bar 78, in conjunction with the force of gravity, causes the handle grip 28 of the handle frame section 20 to move in a downward motion, while bringing the upper end of the rear wheel frame 52, where the lever assembly is attached, upwards and towards the support bar 78. The user simultaneously releases the locking hinge bar 92 which springs back until restrictive tab 84 hits the back bar 32, thereby positioning the locking hinge 82 for automatic locking the next time the stroller 10 is converted back to the operative state. As the upper support bar 78 moves higher the stroller 10 continues to collapse until it reaches its storage state. Although the left side is shown here, the same procedure is simultaneously taking place on the right side. Furthermore, it can be appreciated that a locking hinge assembly can be effectuated utilizing only one side of the stroller.

Figure 3:
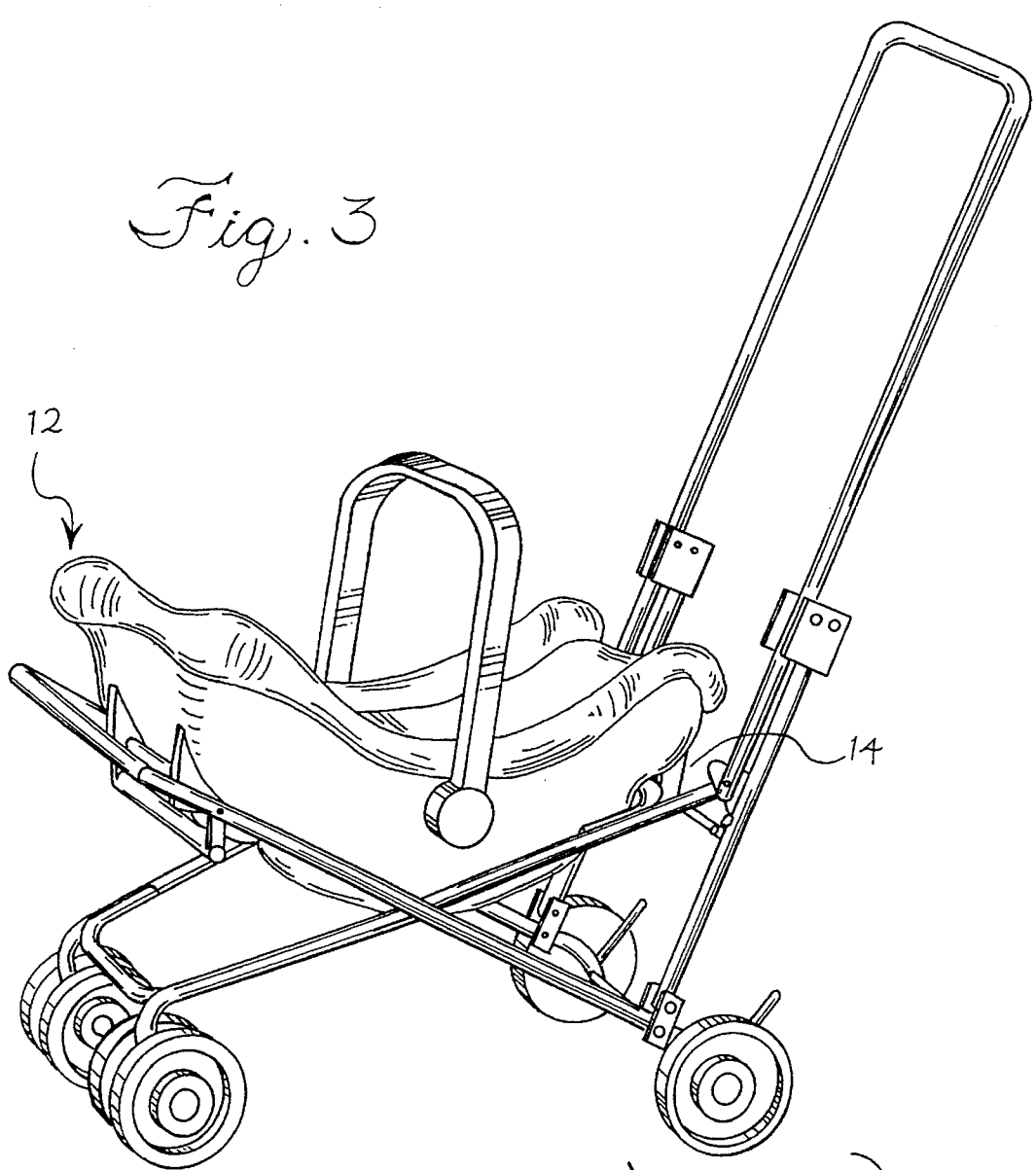
FIG. 3 is a perspective view of a preferred embodiment of a stroller according to the present invention after receiving a child's car seat.

FIG. 3 shows the stroller 10 in the present invention in its operative state after receiving a child's car seat 12. The child's car seat 12 shown in FIG. 3 is similar to the Century 590 child's car seat which includes a stationary flange 14, along with stationary tabs 16 and movable tabs 18 (only one shown). The stationary and movable tabs 16, 18 act to lock the child's car seat 12 around any object that fits in between the tabs.

The child's car seat 12 is prevented from rotating around the hinge rod sheath 58 by the rear wheel frame mid-section 53, thus preventing the child's car seat 12 from accidentally flipping over the front of the stroller 10.

The stroller 10, in its operational state, receives a child's car seat 12 by the user placing the child's car seat 12 such that the hinge rod sheath 68 slides between the stationary tab 16 and the movable tab 18 of the child's car seat 12. This action will lock the child's car seat 12 to the stroller. At the same time, the stationary flange 14 on the child's car seat 12 will hook over the upper support bar 78, which provides support for the child's car seat 12.

Removal of the child's car seat 12 from the stroller 10 is greatly simplified by the lever assembly 60. This device, operable with one hand, can simultaneously depress both movable tabs, leaving the user with a free hand to lift the child's car seat 12 off the stroller 10. The left and right movable tabs are relatively far apart, and both movable tabs must be depressed simultaneously to release the child's car seat 12. Without the lever assembly 60, it is very difficult to release the left and right movable tabs and simultaneously lift the child's car seat 12 off the stroller 10.

Figures 5A, 5B, 5C:
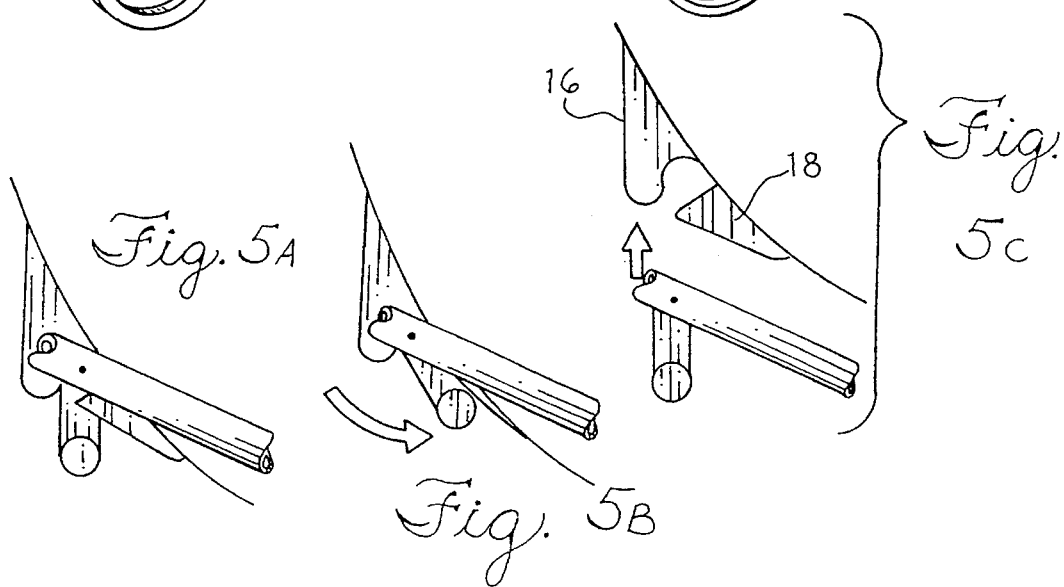
FIG. 5 is a three-step exploded view of the lever assembly as it rotates to allow easy removal of the child's car seat.

FIGS. 5A, B and C show the actuation of the lever assembly 60 when the child's car seat 12 is to be removed from the stroller 10. As described above and shown in FIG. 5A, when the child's car seat 12 is received by the stroller 10 the stationary tabs 16 and movable tabs 18 act to lock the child's car seat 12 in place on the hinge rod sheath 68. To remove the child's car seat 12, the release lever 62 is rotated around the hinge rod 66 in the direction of the left and right movable tabs 18. As the release lever 62 contacts both movable tabs 18, the movable tabs will move toward the child's car seat 12 thereby allowing the child's car seat the freedom to be released from the stroller as shown in FIG. 5B. Although only one tab 18 is shown, it can be appreciated that the two tabs 18 located on the child's car seat 12 are simultaneously depressed to release the child's car seat 12. Finally, as shown in FIG. 5C, the child's car seat 12 can be lifted with the other hand upwardly away from the hinge rod sheath 68 and away from the stroller 10. Once the child's car seat 12 is removed, the stroller 10 can be converted from its operational state to its storage state.

The locking hinge assembly 80 is automatically activated when the stroller 10 is converted from its storage state to its operational state (refer to FIG. 4 and FIG. 7). As the stroller 10 is being converted to its operational state, the chamfer 91 on the locking hinge 82 comes in contact with the latch bushing 24, causing the locking hinges 82 to pivot about the pivot pin 88, which stretches the spring 90 (FIG. 4B). When the latch bushing 24 is adjacent to the indenture 93, the spring 90 causes the locking hinge 82 to pivot such that the indenture 93 engages the latch bushing 24 (FIG. 4A), preventing the stroller 10 from converting to its storage state.

Figure 6:
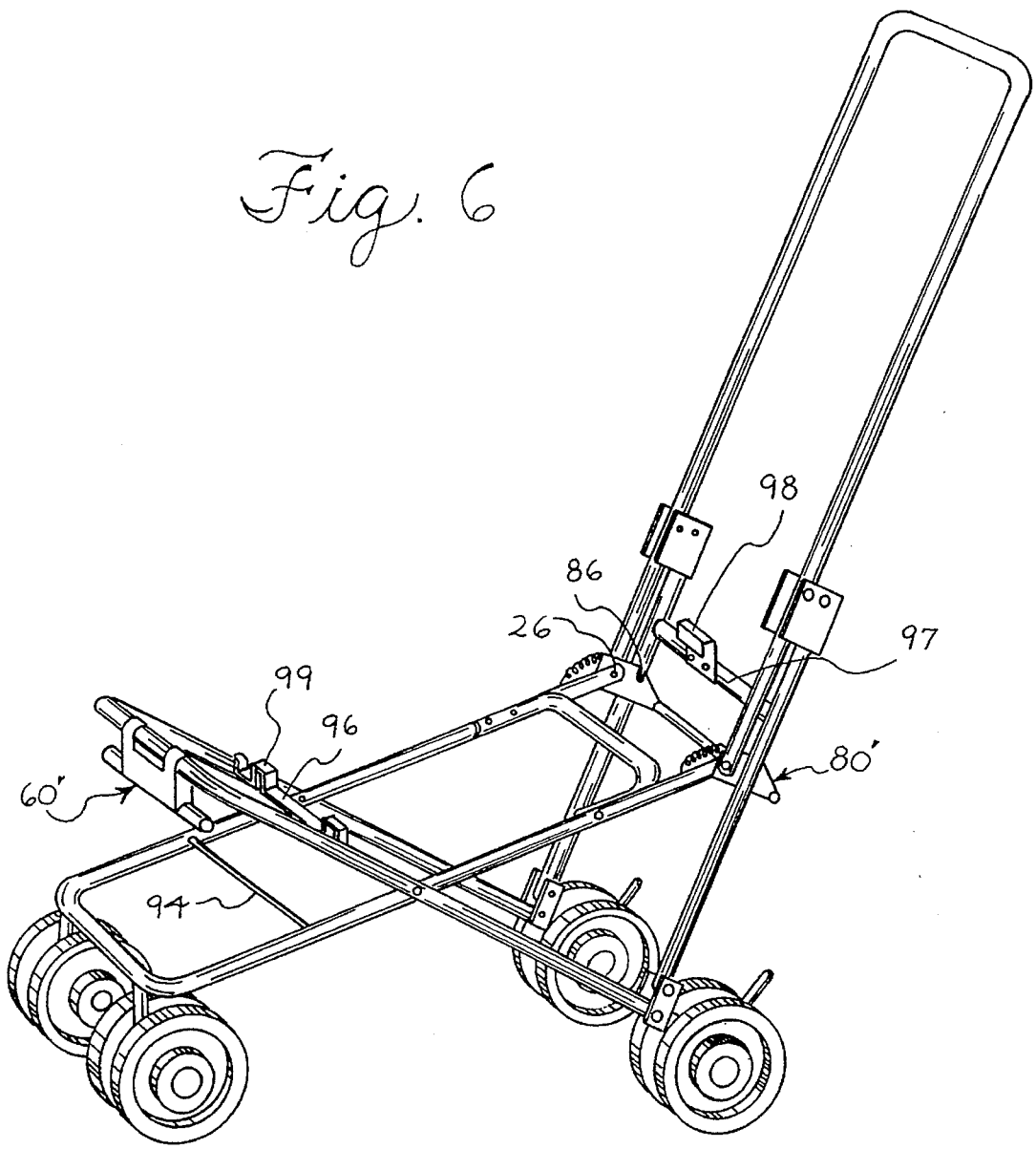
FIG. 6 is a perspective view of alternative embodiments of a stroller according to the present invention in its operative state.

There are two alternative embodiments of the present invention that allow the stroller 10 to adapt to other types of child car seats. FIG. 6 shows these two alternative embodiments, along with several other alternative embodiments discussed later.

Figure 8:
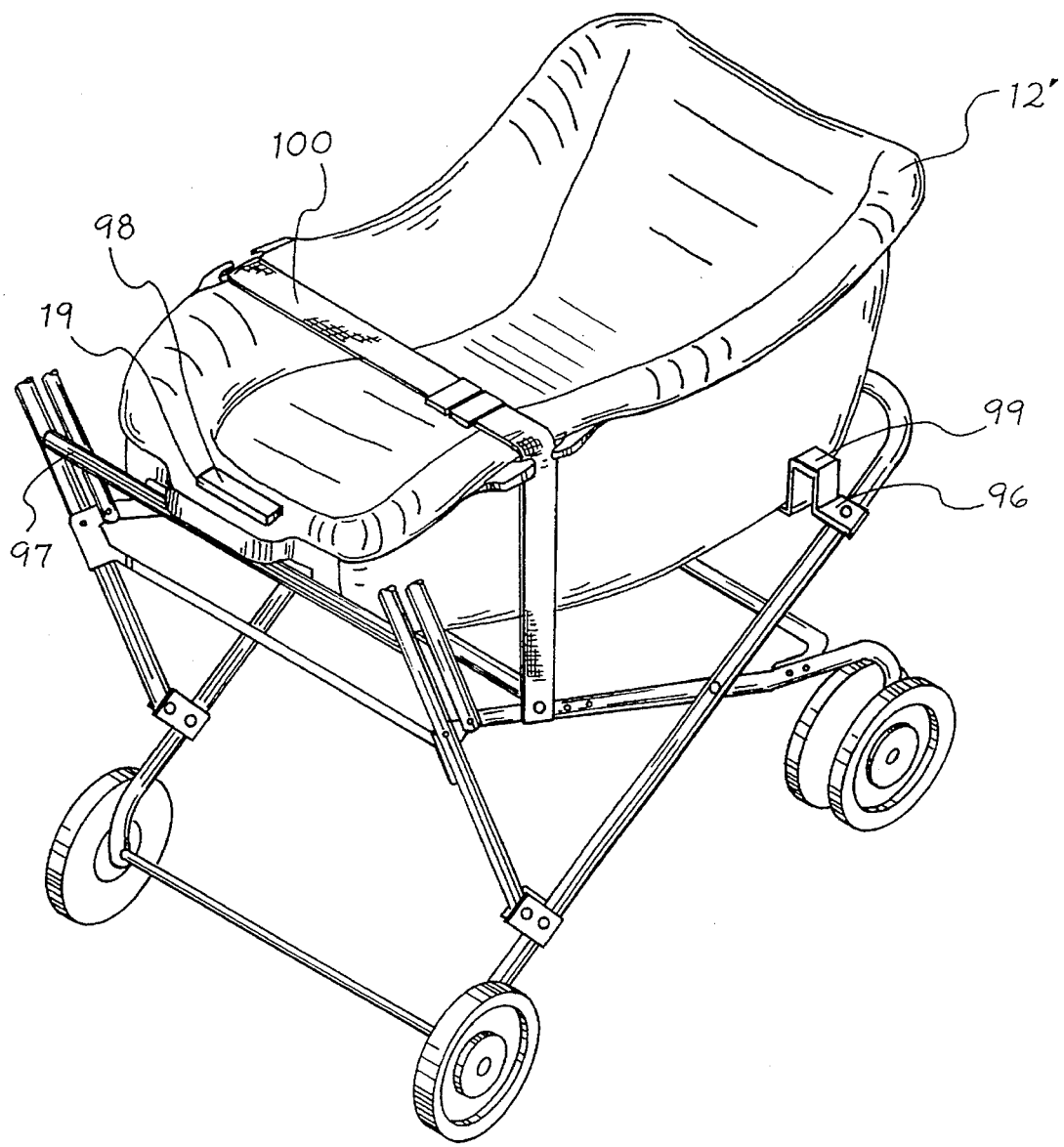
FIG. 8 is an isometric view of an alternative embodiment of a stroller after receiving a child's car seat.

The first alternative embodiment of the present invention allows the stroller to adapt to any child's car seat with a hand grip opening, such as the Evenflo Joy Ride. Refer to FIG. 8, which shows this alternative embodiment after receiving a child's car seat. In FIG. 8 the handle frame section 20 and back bars 32 are cut away for clarity.

By attaching a main support bar 96, a handle support bar 97 with an attached handle support bar post 98, and a seat belt 100 to the stroller 10, any child's car seat with a hand grip opening 19 can be secured to the stroller 10. In this alternative embodiment, the user attaches the child's car seat 12' by placing it onto the main support bar 96 and the handle support bar 97 such that the handle support bar post 98 protrudes through the hand grip opening 19 as shown, then fastening the seat belt 100. The main support bar 96 supports the weight of the child's car seat 12', while the two main support bar tabs 99 restrict unwanted side to side movement of the head end of the child's car seat 12'. The handle support bar 97 supports the weight of the child's car seat 12', while the handle support bar post restricts unwanted side to side movement of the foot end of the child's car seat 12'. The handle support bar post also restricts unwanted front to back movement of the child's car seat 12'. The seat belt 100 holds the child's car seat 12' firmly down on the main support bar 96 and the handle support bar 97 so that the child's car seat 12' cannot move in any direction even if the stroller 10 is jarred. The user removes the child's car seat 12' by releasing the seat belt 100 and lifting the child's car seat off the stroller.

The second alternative embodiment of the present invention allows the stroller 10 to adapt to any child's car seat with an integral locking mechanism that is easily released by the user, such, as the Fisher Price infant car seat (not shown). By attaching a stationary bar 94 to the front wheel frame 72, near the front wheel assembly 76, any such child's car seat can be secured to the stroller. In this alternative embodiment, the user attaches the child's car seat by locking the integral locking mechanism onto the stationary bar 94 and setting the opposite end of the child's car seat onto the upper support bar 78. The user removes the child's car seat by unlocking the integral locking mechanism and lifting the child's car seat off the stroller.

The child's car seat is prevented from rotating around the stationary bar 94 by the rear wheel frame mid-section 53, thus preventing the child's car seat from accidentally flipping over the front of the stroller 10.

It can be appreciated that the stationary bar 94 can span the left and right sides of the stroller at other locations depending on the exact geometry of the child's car seat, thus allowing the stroller to adapt to any number of existing child's car seats with integral locking mechanisms. It can also be appreciated that the stationary bar 94 can be used in conjunction with the handle support bar 97, and the handle support bar post 98 for child's car seats that have both an integral locking mechanism and a hand grip opening 19.

Still another alternative embodiment can be seen in FIG. 6. The locking hinge assembly 80' can be attached to the intersection between the handle frame section 20 and the front wheel frame section 70. In this embodiment the locking hinge 82 would rotate freely around the latch hinge pin 26 and, instead of a pivot pin 88, the back bar 32 would have a locking tab 86 to engage the indenture 93 of the locking hinge 82. As the stroller 10 converted from its operative state to its storage state, the locking hinge assembly 80 would travel upwardly with the intersection of the handle frame section 20 and the front wheel frame section 70.

Also, the lever assembly 60' could be mounted at the end of the rear wheel frame section 50 thereby acting as both a support for the rear wheel frame section 50 and a support for the child's car seat 12 received by the stroller 10.

It can be seen that the objects of the invention have been achieved by the structures and methods described above. It is to be understood that the present invention is not limited to the described embodiments, but may apply to modifications and variations obvious to a person having ordinary skill in the art.

We claim:

1. A stroller for accepting and supporting a child's car seat comprising a collapsible frame, said collapsible frame comprising a locking hinge assembly, said locking hinge assembly comprising at least one locking hinge defining an indenture, at least one locking tab, at least one pivot pin, at least one spring, at least one restricting tab and a locking hinge bar, said at least one locking hinge being connected to said collapsible frame by said at least one pivot pin, said at least one spring is connected to said at least one locking hinge thereby placing a rotational force on said at least one locking hinge creating movement around said at least one pivot pin, said movement being limiting by said at least one restricting tab, said at least one locking tab fitting into said indenture when said at least one locking hinge is placed into a locking position, such that said collapsible frame can be converted from an operational state to a storage state by actuating said locking hinge assembly utilizing a single, one-handed motion.

2. The stroller defined in claim 1 wherein said at least one locking hinge is placed into a locking position automatically upon conversion of the stroller from said storage state to said operational state.

3. The stroller defined in claim 1 wherein said at least one locking hinge is prohibited from moving from said locking position when said child's car seat is received by said stroller.

4. A stroller for accepting and supporting a child's car seat comprising a collapsible frame, said collapsible frame comprising a locking hinge assembly, such that said collapsible frame can be converted from an operational state to a storage state by actuating said locking hinge assembly utilizing a single, one-handed motion, said collapsible frame comprises a lever assembly, said lever assembly comprising a hinge rod, a release lever, a right pivoting cap and a left pivoting cap, said hinge rod being connected to said collapsible frame, said right and left pivoting caps are relatively connected to said hinge rod, said release lever having said right and left pivoting caps connected at each end of said release lever such that said release lever can rotate around said hinge rod such that said lever assembly is capable of being actuated to simultaneously depress a plurality of movable tabs, said tabs residing on said child's car seat, thus releasing said child's car seat from said stroller utilizing a single, one-handed motion.

\* \* \* \* \*